(12) United States Patent
Saito et al.

(10) Patent No.: US 7,277,237 B2
(45) Date of Patent: Oct. 2, 2007

(54) AF CONTROL APPARATUS FOR ZOOM LENS SYSTEM

(75) Inventors: Noboru Saito, Saitama (JP); Takamitsu Sasaki, Saitama (JP); Hideyuki Yamamoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 17 days.

(21) Appl. No.: 11/121,014

(22) Filed: May 4, 2005

(65) Prior Publication Data
US 2005/0254143 A1    Nov. 17, 2005

(30) Foreign Application Priority Data
May 12, 2004   (JP)   ............. 2004-142896
May 12, 2004   (JP)   ............. 2004-142897

(51) Int. Cl.
*G02B 15/14*    (2006.01)
*G03B 17/00*    (2006.01)

(52) U.S. Cl. ............... 359/698; 359/694; 396/79
(58) Field of Classification Search ......... 359/694, 359/698, 676–692; 396/79–83
See application file for complete search history.

(56) References Cited

U.S. PATENT DOCUMENTS 5,784,206 A   7/1998  Nomura et al. ......... 359/698
5,850,312 A   12/1998 Kato et al. ............ 359/689
6,122,112 A * 9/2000  Oono et al. ........... 359/694
6,311,019 B1* 10/2001 Ide .................... 396/95
7,119,968 B2* 10/2006 Saito et al. ........... 359/698

FOREIGN PATENT DOCUMENTS

JP    7-120678    5/1995
JP    2548307     8/1996

OTHER PUBLICATIONS

English Language Abstract of JP 7-120678.

* cited by examiner

*Primary Examiner*—Mohammed Hasan
(74) *Attorney, Agent, or Firm*—Greenblum & Bernstein, P.L.C.

(57) ABSTRACT

An AF control apparatus for a zoom lens system includes a movable lens group serving as a zooming lens group and a focusing lens group in the zoom lens system; a focusing table which stores focusing data for the movable lens group; a zooming table which stores zooming data for the movable lens group, the zooming table having different data from the focusing table; and a driving device for moving the movable lens group in an optical axis direction of the zoom lens system according to data stored in the focusing table and the zooming table.

21 Claims, 10 Drawing Sheets

Zoom Paths for Each Photographing Distance

Fig. 9

Zoom Step
Image Magnification Obtained
Based on Zooming Table Data

Fig. 12

Zoom Step
Image Magnification Obtained
Based on Focusing Table Data

Zoom Paths for Each Photographing Distance

AF CONTROL APPARATUS FOR ZOOM LENS SYSTEM

BACKGROUND OF THE INVENTION

1. Field of the Invention

The present invention relates to an AF (auto focusing) control apparatus for a zoom lens for controlling movable lens groups serving as a zoom lens and a focusing lens.

2. Description of the Related Art

The publication of Japanese Patent No. 2548307 discloses a zoom lens system having a plurality of lens groups. In this zoom lens system, only the rearmost lens group positioned closest to the image side operates as a focusing lens group. However, since the focusing sensitivity of the rearmost lens group is almost constant regardless of the focal length of the zoom lens system, the moving distance of the rearmost lens group during focusing is larger at the telephoto side than at the wide-angle side. Therefore, in such an AF mechanism, the AF operation at the telephoto side requires a large amount of time. Also, in order to shorten the minimum photographing distance as much as possible, a large moving distance of the rearmost lens group is required. However, the moving distance of the rearmost lens group cannot be sufficiently increased since interference with the lens group provide in front of the rearmost lens group must be avoided. Therefore, the minimum photographing distance cannot be shortened very much.

In this regard, an AF control apparatus has been developed in which two lens groups in a zoom lens system having a plurality of lens groups serve as a focusing lens. The two lens groups are moved together along an optical axis so as to reduce the moving distance of the two focusing lens groups during an AF operation and to shorten the AF operation time and the minimum photographing distance particularly in a telephoto side (for example, Japanese Patent Laid-Open Publication No. Hei 7-120678).

Such an AF control apparatus with two movable lens groups may be configured through, for example, providing pulse motors for moving the two focusing lens groups in a direction of an optical axis, and driving the pulse motors according to data stored in a focusing table.

In such an AF control apparatus, a simpler control system can be configured through controlling the pulse motors during zooming by use of a focusing table.

However, in the case when the image magnification is changed stepwise from a wide-angle side to a telephoto side, a zooming operation carried out via focusing table data sometimes results in a reversed phenomenon in which an image magnification becomes larger than that of the previous zoom step, or an unchanged phenomenon in which a magnification does not change in an intermediate zoom step. If images are continuously displayed on the monitor of a digital camera under this situation, the user may notice such unnatural zooming. Such a reversed phenomenon or unchanged phenomenon also occurs when magnification is varied stepwise from a telephoto side to a wide-angle side.

SUMMARY OF THE INVENTION

The present invention provides an AF control apparatus which can prevent the image magnification from being inversed or unchanged during a zooming operation and can adjust zooming in a simple manner.

According to an aspect of the present invention, an AF control apparatus for a zoom lens system is provided, including a movable lens group serving as a zooming lens group and a focusing lens group in the zoom lens system; a focusing table which stores focusing data for the movable lens group; a zooming table which stores zooming data for the movable lens group, the zooming table having different data from the focusing table; and a driving device for moving the movable lens group in an optical axis direction of the zoom lens system according to data stored in the focusing table and the zooming table.

It is desirable for data values of the zooming table and the focusing table to be the same at the wide-angle extremity and at the telephoto extremity.

It is desirable for the driving device to drive the movable lens group to automatically move according to the data stored in the focusing table upon completion of a zooming operation.

It is desirable for the movable lens group to include two movable lens groups.

The AF control apparatus can include a step zoom mechanism for moving a plurality of the movable lens group along a zoom step path by a plurality of zoom steps. A zoom path of each of the movable lens groups during an auto focusing operation is defined so that a ratio of moving distances of the movable lens groups at each of the zoom steps is a predetermined value defined for the each of the zoom steps.

It is desirable for the plurality of the movable lens groups to be two movable lens groups.

It is desirable for the driving device to include a plurality of pulse motors, the number of which corresponds to the number of the movable lens groups, each of the pulse motors providing a driving force to respective each of the movable lens groups, wherein the pulse motors have the same step angle; a plurality of rotational force transmission mechanisms, the number of which corresponds to the number of the movable lens groups, each of the rotational force transmission mechanisms transmitting a driving force generated by respective the each of the pulse motors to respective the each of the movable lens groups, wherein the rotational force transmission mechanisms have the same moving pitch; and a control device for sending a pulse signal having a pulse rate defined for each pulse motor to each of the pulse motors. A ratio of the pulse rates, of the pulse signals to be sent to respective the pulse motors during the autofocusing operation, is the same as a corresponding ratio of the moving distances of the movable lens groups determined via the focusing table.

It is desirable for the ratio of the moving distances for at least one zoom step to be an integer ratio.

It is desirable for the two movable lens groups include second and fourth lens groups of a four-lens-group zoom lens system.

It is desirable for the moving distance of the fourth lens group to be larger than the moving distance of the second lens group during the autofocusing operation.

It is desirable for the zoom paths of the movable lens group to be parallel to each other from the telephoto extremity to at least one zoom step therefrom.

The present disclosure relates to subject matter contained in Japanese Patent Application Nos. 2004-142896 and 2004-142897 (both filed on May 12, 2004) which are expressly incorporated herein by reference in their entireties.

DESCRIPTION OF THE PREFERRED EMBODIMENTS

An embodiment of the present invention will be described hereinafter with reference to the accompanying drawings. First of all, the general configuration of a digital camera 10 to which the invention is applied will briefly described with reference to FIGS. 1 to 5.

The digital camera 10 includes a camera body 10a containing a photographic optical system (L1 through L4). The camera body 10a has a box shape (rectangular tube) which is elongated along the optical axis O of the photographic optical system. Various buttons such as a power button B1 are provided on the top surface of the camera body 10a, and a monitor (not shown) is provided on the rear side surface.

Figure 2:
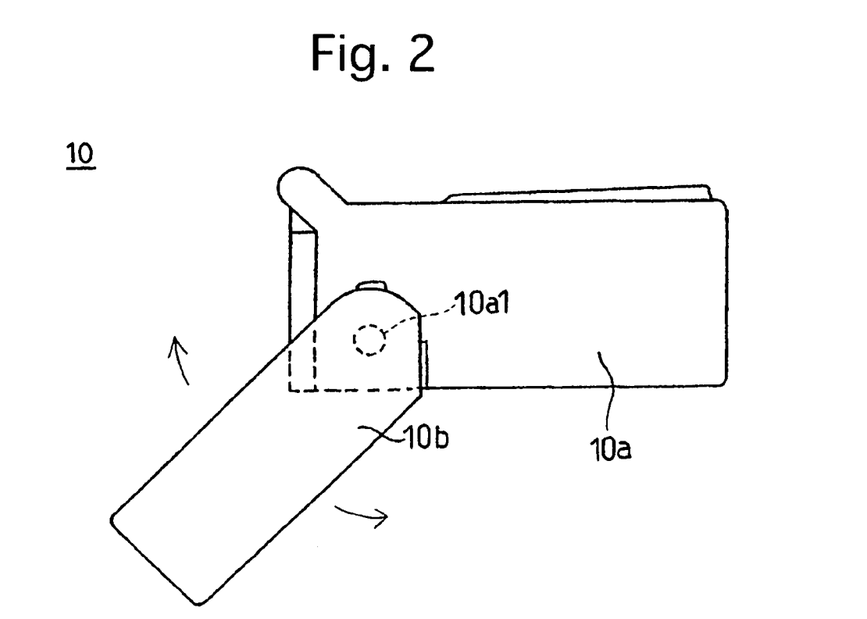
FIG. 2 is a side view of the digital camera shown in FIG. 1.

A grip 10b having an elongated box shape (rectangular tube) for the user to hold is pivotally attached to a rotational axis 10a1 protruded through a side surface of the camera body 10a. As shown in FIG. 2, the grip 10b can move rotationally about the rotational axis 10a1 in front and rear directions with respect to the camera body 10a. A shutter button B2 is provided on the grip 10b, and a zoom operation lever ZL having a ring shape is provided around the shutter button B2 so as to move rotationally around the axis of the shutter button B2. The zoom operation lever ZL is constantly biased by a spring (not shown) to an initial position.

Figure 3:
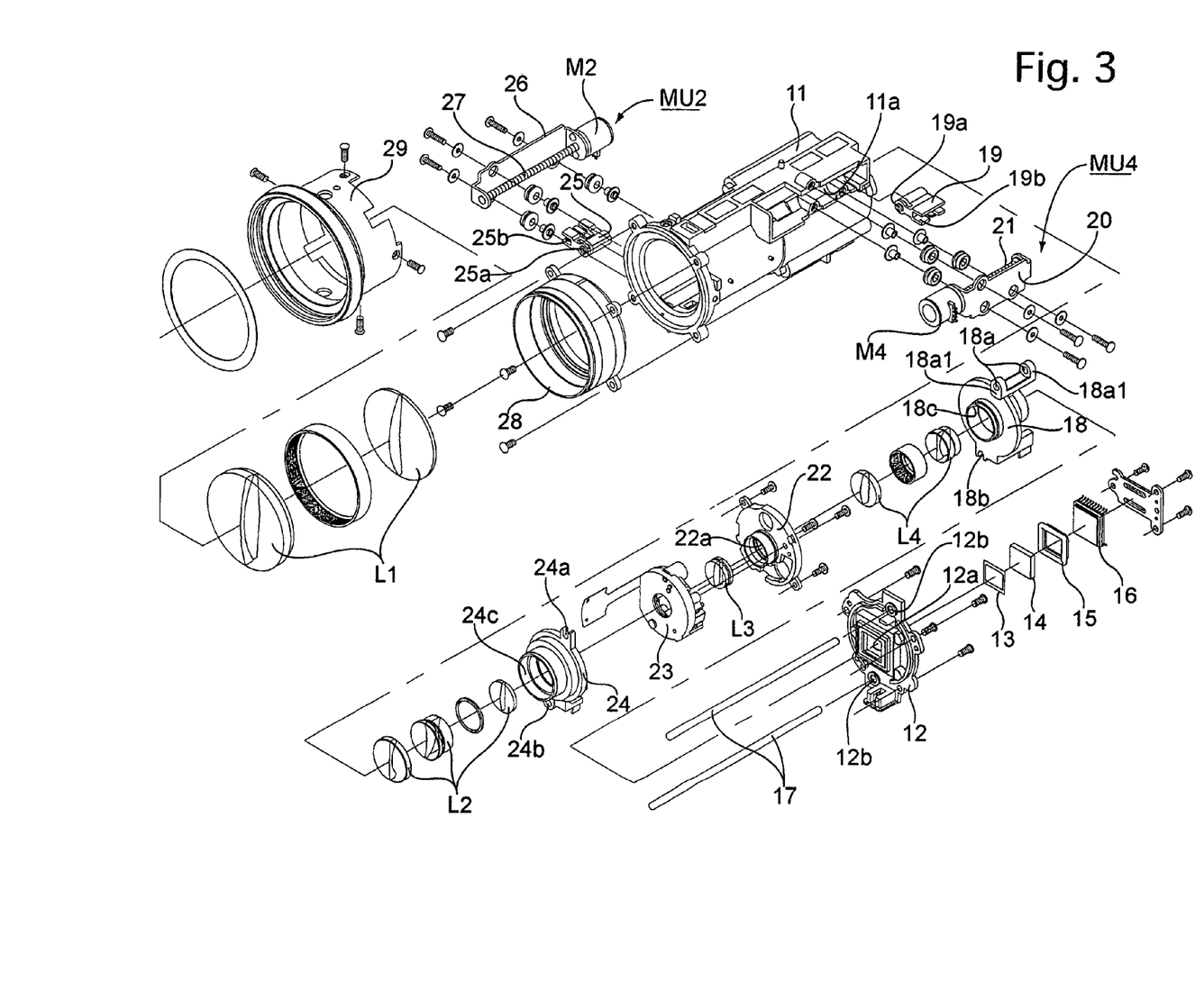
FIG. 3 is an exploded perspective view showing the internal components of the digital camera shown in FIG. 1.
Figure 4:
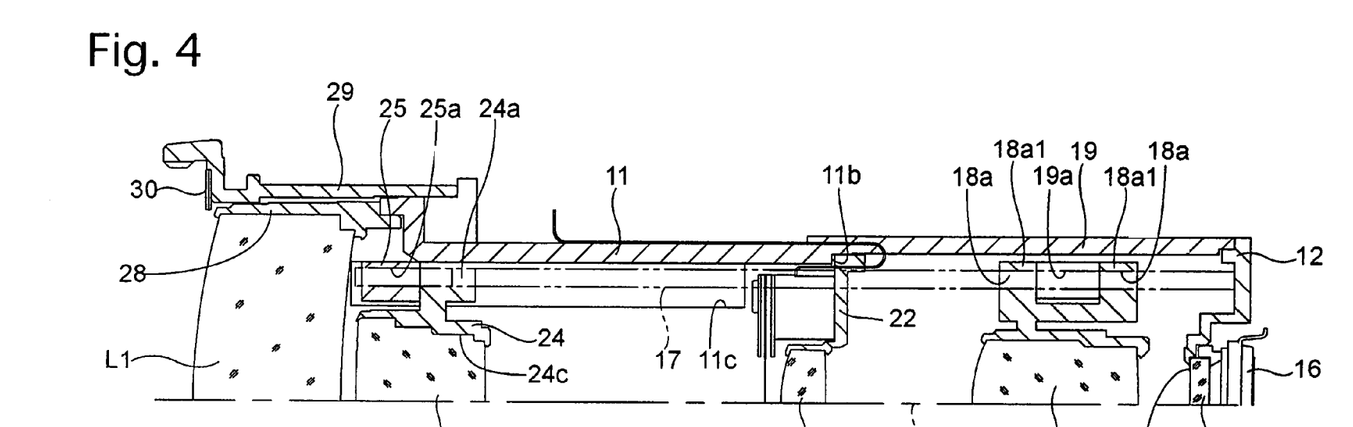
FIG. 4 is a side view showing a cross section of a zoom lens system and other components when the zoom lens system is located at the wide-angle extremity.
Figure 5:
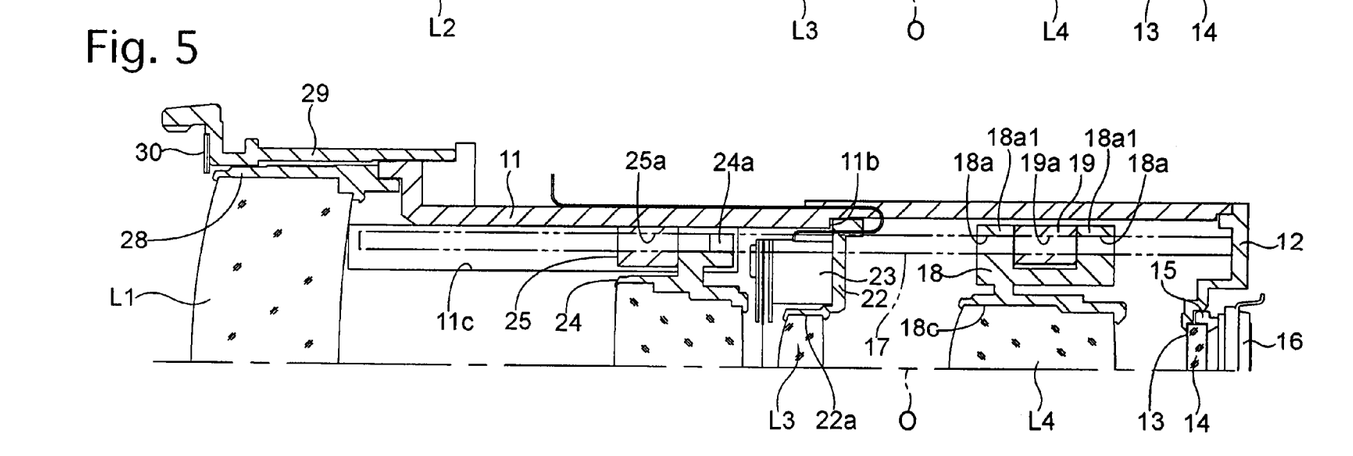
FIG. 5 is a side view showing a cross section of the zoom lens system and other components when the zoom lens system is located at the telephoto extremity.
Figure 6:
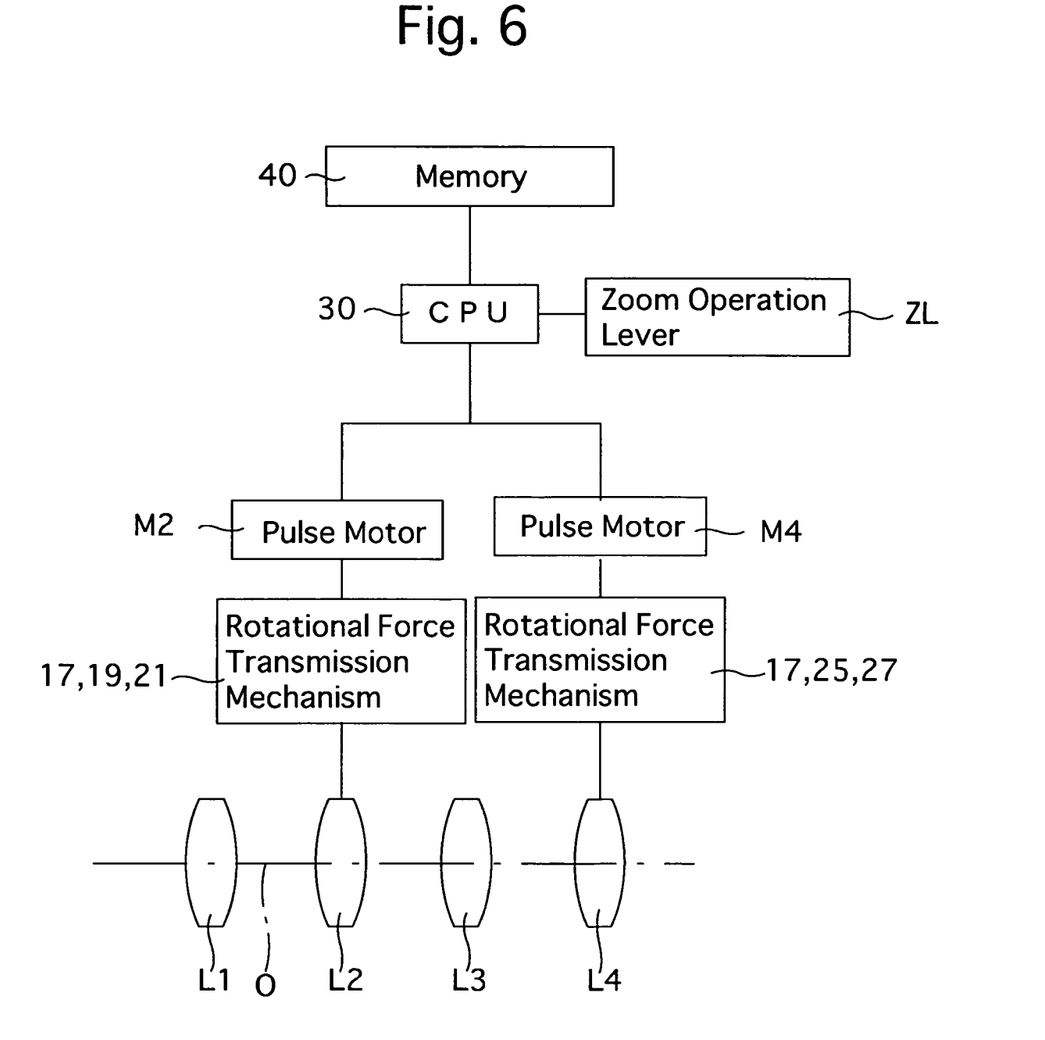
FIG. 6 is a schematic diagram showing the relationship between each of the lens groups, driving mechanisms, and control mechanisms.

As shown in FIGS. 3 to 5, a lens housing 11 having openings at front and rear ends is fixedly mounted so as to extend along the optical axis O inside the camera body 10a, and the four lens groups L1 through L4 which constitute the photographing optical system are provided in the lens housing 11.

A CCD mounting plate 12 is fixedly attached to the rear opening of the lens housing 11 by a plurality of screws. A screen 13, a low-pass filter 14, packing 15, and a CCD (imaging device) 16 are layered along the optical axis O and fixedly attached to a square mounting hole 12a provided in the CCD mounting plate 12.

A pair of upper and lower supporting holes 12b is formed in the CCD mounting plate 12. The rear ends of a pair of upper and lower guide rods 17 parallel to the optical axis O are fixedly fitted into the supporting holes 12b. The front ends of the guide rods 17 are supported by a supporting member (not shown) provided in the front end of the inside of the lens housing 11. A pair of front and rear protrusions 18a1 is provided in the top of a fourth frame 18 positioned inside the lens housing 11, and guide holes 18a coaxial to each other are provided in the protrusions 18a1. The inner end of a rack 19 is fitted between the front and rear protrusions 18a1. The upper guide rod 17 is slidably fitted into the front and rear guide holes 18a and a guide hole 19a provided in the inner end of the rack 19 coaxial to the front and rear guide holes 18a, and the lower guide rod 17 is slidably engaged with a guide hole 18b formed in the bottom of the fourth frame 18. A fourth lens group L4 (movable lens group, second focusing lens group) composed of 3 lenses is fixedly fitted into a supporting hole 18c of the fourth frame 18. As described above, the fourth lens group L4 can travel linearly along the upper and lower guide rods 17 in the direction of the optical axis O, but cannot rotate around the optical axis O, thereby serving as a zooming lens group and a focusing lens group.

An opening 11a is formed near the rear end of the periphery of the lens housing 11, and a pulse motor unit MU4 is fixedly mounted to a position corresponding to the opening 11a formed in the periphery of the lens housing 11. The pulse motor unit MU4 includes a motor mounting plate 20, a feeding screw 21, and a pulse motor M4 (driving device). The motor mounting plate 20 is fixedly attached to the periphery of the lens housing 11 by a plurality of screws. The feeding screw 21 is parallel to the optical axis O and is rotatably supported by the motor mounting plate 20 so as to rotate by its own axis. The pulse motor M4 is fixedly attached to the front end of the motor mounting plate 20. The driving shaft of the pulse motor M4 is coaxially fixed (integrated) to the front end of the feeding screw 21. The outer end of the rack 19 is protruded to the outside of the lens housing 11 through the opening 11a, and a rack groove 19b formed in the outer end of the rack 19 is screw-engaged with the feed screw 21. The upper guide rod 17, the feed screw 21, and the rack 19 (the rack groove 19b) are components of a rotational force transmission mechanism.

As shown in FIGS. 3 to 5, a third frame 22 is disposed in front of the fourth lens group L4 in the lens housing 11, and is fixedly attached to a ring-shaped mounting surface 11b formed about midway of the inner periphery of the lens housing 11 by a plurality of screws. A third lens group L3 is fixedly fitted into a supporting hole 22a provided in the third frame 22, and a shutter block 23 is fixedly attached to the front of the third frame 22.

A second frame 24 is disposed in front of the third frame 22 in the lens housing 11. The upper guide rod 17 is slidably engaged with a guide groove 24a formed on the top of the second frame 24, and the lower guide rod 17 is slidably fitted into a guide hole 24b formed on the bottom of the second frame 24. A second lens group L2 (movable lens group) composed of four lens elements is fixedly fitted into a supporting hole 24c of the second frame 24. As described above, the second lens group L2 can move linearly in the direction of the optical axis O along the upper and lower guide rods 17, but cannot rotate around the optical axis O, thereby serving as a zooming lens group and a focusing lens group.

Moreover, a guide hole 25a parallel to the optical axis O is provided in a rack 25 fixedly attached to the second frame 24, and the upper guide rod 17 is slidably fitted into the guide hole 25a. The outer end of the rack 25 protrudes to the outside of the lens housing 11 through an opening 11c formed on the opposite side of the opening 11a in the lens housing 11 (see FIGS. 4 and 5). A pulse motor unit MU2 is fixedly mounted at a position corresponding to the opening 11c formed in the periphery of the lens housing 11 by a plurality of screws. The pulse motor unit MU2 has the same configuration as the pulse motor unit MU4 and includes a motor mounting plate 26, a feed screw 27, and a pulse motor M2 (driving device). The feed screw 27 is screw-engaged with a rack groove 25b having the same pitch as the rack groove 19b and formed in the outer end of the rack 25. The upper guide rod 17, the feed screw 27, and the rack 25 (the rack groove 25b) are components of the rotational force transmission mechanism.

The upper and lower guide rods 17, the fourth frame 18, the pulse motor units MU2 and MU4, the rack 19, the second frame 24, the rack 25, a CPU 30, and a memory 40 are components of a step zoom mechanism.

Figure 1:
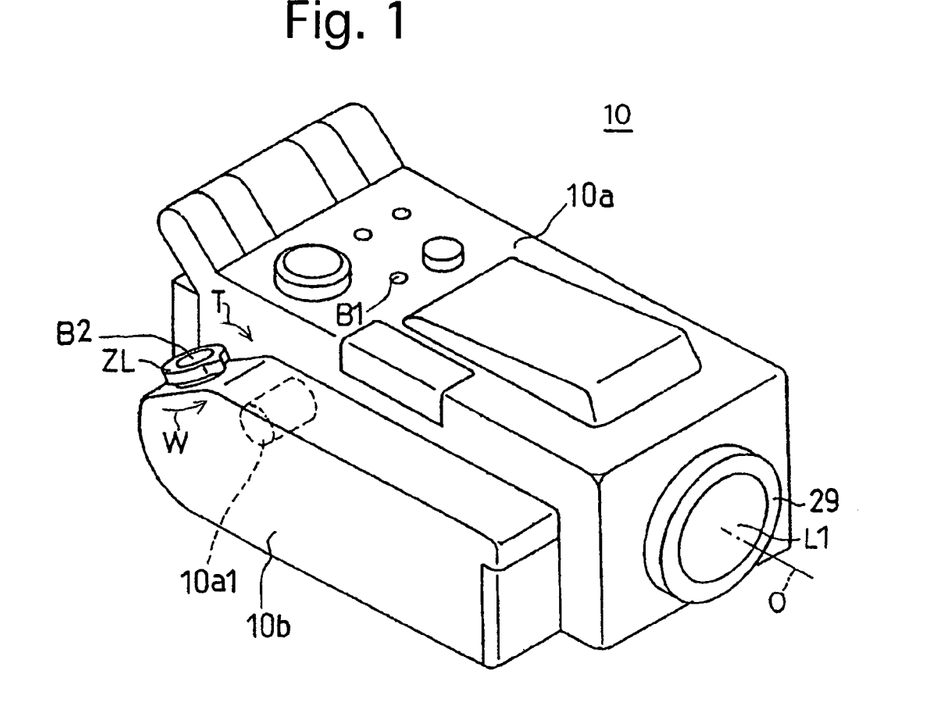
FIG. 1 is a perspective view of the general configuration of a digital camera according to a first embodiment of the present invention.

A first frame 28 is fixedly attached to the front end of the lens housing 11 by a plurality of screws, and a first lens group L1 composed of 3 lenses is fixedly fitted into the first frame 28. As shown in FIG. 1, the first lens group L1 is exposed at the front end of the camera body 10a, and a ring shaped filter screw 29 is provided on the front end of the lens housing 11. The filter screw 29 is located on the external side of the first frame 28, and accessories such as a filter can be attached thereto.

The zoom operation lever ZL, the CCD 16, the monitor, and the pulse motors M2 and M4 are electrically connected to the CPU 30 (control device) provided in the camera body, and the memory 40 is also electrically connected to the CPU 30. In the memory 40, a control program for zooming and focusing is installed, respective zooming tables for the second and fourth lens groups L2 and L4 is stored, and a focusing table of each zoom step for one of the second lens group L2 and the fourth lens group L4 is also stored. The pulse motors M2 and M4 rotate upon receiving a command from the CPU 30 causing the corresponding feed screws 21 and 27 to rotate about their respective axes. When the feed screws 21 and 27 rotate, the rear rack 19 and the front rack 25 travel along the guide rods 17 in the direction of the optical axis O, causing the second and fourth lens groups L2 and L4 to travel linearly along the optical axis O.

Since the first lens group L1 and the third lens group L3 are fixedly attached to the lens housing 11 as described above, they do not travel during zooming and focusing. In other words, the first lens group L1 does not travel forward beyond the position shown in the FIGS. 4 and 5. Hence, the zoom optical system of the digital camera 10 of the present invention is an inner-zoom type and also an inner-focusing type in which the lens barrel does not extend outside the camera body during zooming and focusing. When the power button B1 is turned on, an image transmitted through the photographic optical system is automatically picked-up by the CCD 16 as necessary, and all the picked-up images can be displayed on the monitor as a still image.

Figure 8:
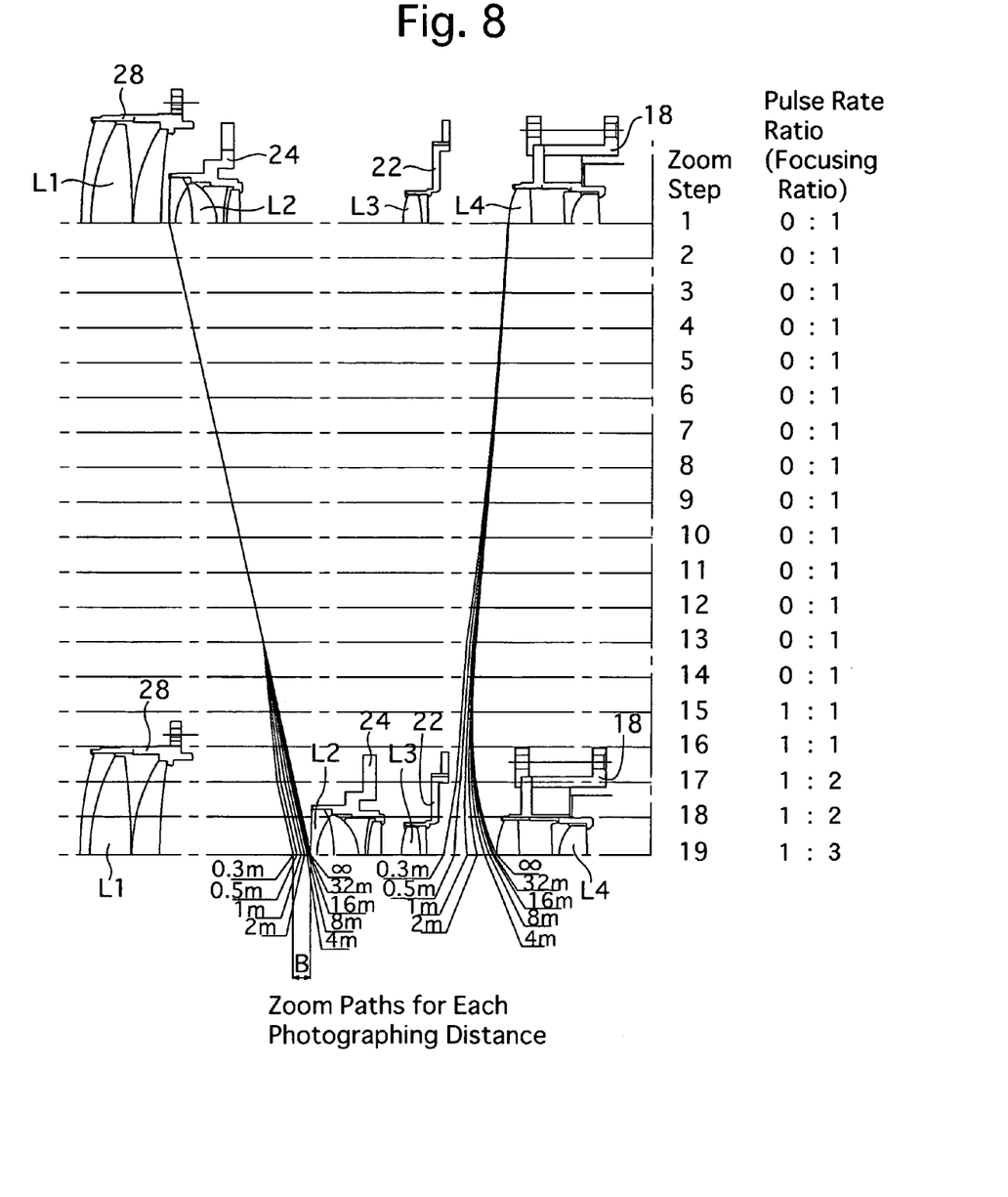
FIG. 8 shows the zoom paths of the respective lens groups during step zooming.

The present digital camera 10 performs zooming by a step zooming method, and nineteen (19) zoom steps are provided over the entire zoom range as shown in FIG. 8. When the zoom lens system proceeds from zoom step 1 (wide-angle extremity) to zoom step 19 (telephoto extremity), the focal length of the zoom lens system is varied in nineteen (19) levels, gradually increasing the focal length. When the power button B1 is operated so as to be turned ON or turned OFF, the CPU 30 sends a pulse signal to the pulse motors M2 and M4 to cause the second and fourth lens groups L2 and L4 to automatically travel to the wide-angle extremity shown in FIG. 4.

An operating procedure for allowing the second and fourth lens groups L2 and L4 to travel in the zoom lens system configured as above and the operation of the second and fourth lens groups L2 and L4 will be described hereinafter with reference mainly to FIGS. 6 to 13. First of all, an operating procedure during zooming from the wide-angle extremity to the telephoto extremity and the operation of the second and fourth lens groups L2 and L4 will be described with reference to a flowchart shown in FIG. 7.

When the zoom operation lever ZL is turned to the telephoto side (the direction represented by an arrow T in FIG. 1) (step S11), the CPU 30 determines whether or not the power button B1 is ON and the shutter button B2 is not pressed (step S12). If the power button B1 is OFF or the shutter button B2 is pressed, the CPU 30 does not proceed to the next step. On the other hand, if the CPU 30 determines that the power button B1 is ON and the shutter button B2 is not pressed in step S12, the CPU 30 determines whether or not the current zoom step N (N is an integer between 1 and 19, N=1 in this case) of the second and fourth lens groups L2 and L4 is zoom step 19 (the telephoto extremity) (step S13). The number of pulses of the pulse signals sent from the CPU 30 to the pulse motors M2 and M4 from the time when the power button is turned ON and the phase of each of the pulse signals are all stored in the memory 40. Therefore, the CPU 30 can always identify the current optical axial position of the second and fourth lens groups L2 and L4 through managing the accumulated pulse number and the phase of each of the pulse signals.

If the second and fourth lens groups L2 and L4 are at the telephoto extremity (zoom step 19), the CPU 30 does not read data from the zooming tables for the respective pulse motors M2 and M4 and does not send pulse signals to the pulse motors M2 and M4. Namely, the second and fourth lens groups L2 and L4 do not change their optical axial positions, and the digital camera enters a standby state for photographing. On the other hand, if the second and fourth lens groups L2 and L4 are at the wide-angle extremity (zoom step 1) as in this case, the CPU 30 determines that the second and fourth lens groups L2 and L4 are not at the telephoto extremity. Subsequently, the CPU 30 reads data from the zooming tables for the respective pulse motors M2 and M4 for moving the second and fourth lens groups L2 and L4 from zoom step N (=1) to zoom step N+1 (2, in this case) (step S14), and sends a pulse signal according to the data to the pulse motors M2 and M4. The pulse motors M2 and M4 then rotate in the normal direction, causing the rack 25 to travel in the rear direction along the guide rods 17 and the rack 19 to travel in the front direction along the guide rods 17. Therefore, the second lens group L2 travels in the rearward direction, and the fourth lens group L4 travels in the forward direction. The second and fourth lens groups L2 and L4 thereafter reach a position corresponding to the current photographing distance L (for example, 2 m. A well known distance measuring device (not shown) is provided in the digital camera 10) for zoom step N+1 (=2), which is one step closer to the telephoto side than the last zoom step N (=1).

When the second and fourth lens groups L2 and L4 have traveled to zoom step N+1 (=2) as described above, the CPU 30 determines whether or not the user has discontinued the operation of the zoom operation lever ZL (step S15). If it is determined that the operation has been discontinued, the CPU 30 stops reading data from both of the zooming tables, and reads data from the focusing table and sends predetermined pulse signals to the pulse motors M2 and M4 (step S16). Subsequently, the pulse motors M2 and M4 rotate to move the second and fourth lens groups L2 and L4 to a position corresponding to the current photographing distance L (=2 m) for zoom step N+1 (=2) defined in the focusing table, and the digital camera enters a standby state for photographing (see FIG. 13, which shows the zoom path of the second lens group in accordance with the zooming table and a zoom path obtained by assuming that the zooming path is set based on the focusing table, for zoom steps 14 and 15). On the other hand, if the CPU 30 determines that the operation of the zoom operation lever ZL has not been discontinued, the CPU 30 again determines whether or not zoom step N+1 is the telephoto extremity (zoom step 19) (step S13) according to the accumulated number of pulses which have been sent to the pulse motors M2 and M4 and the phase of each of the pulse signals. If it is determined that zoom step N+1 is zoom step 19, the CPU 30 does not read data from both the zooming tables, and the second and fourth lens groups L2 and L4 are not allowed to travel further. Subsequently, the CPU 30 reads data from the focusing table and sends predetermined pulse signals to the pulse motors M2 and M4 (step S16) to move the second and fourth lens groups L2 and L4 to a position for zoom step N+1 (=2) defined in the focusing table, and the digital camera 10 enters a standby state for photographing. On the other hand, if the second and fourth lens groups L2 and L4 are at zoom step 2 as in this case, the CPU 30 determines that zoom step N+1 (=2) is not the telephoto extremity (zoom step 19), and reads data, from both the zooming tables, for moving the second and fourth lens groups L2 and L4 to a position corresponding to the current photographing distance (=2 m) for zoom step N+2 (=3) from zoom step N+1 (=2) (step S14), thus allowing the second and fourth lens groups L2 and L4 to travel to zoom step N+2 (=3).

Figure 7:
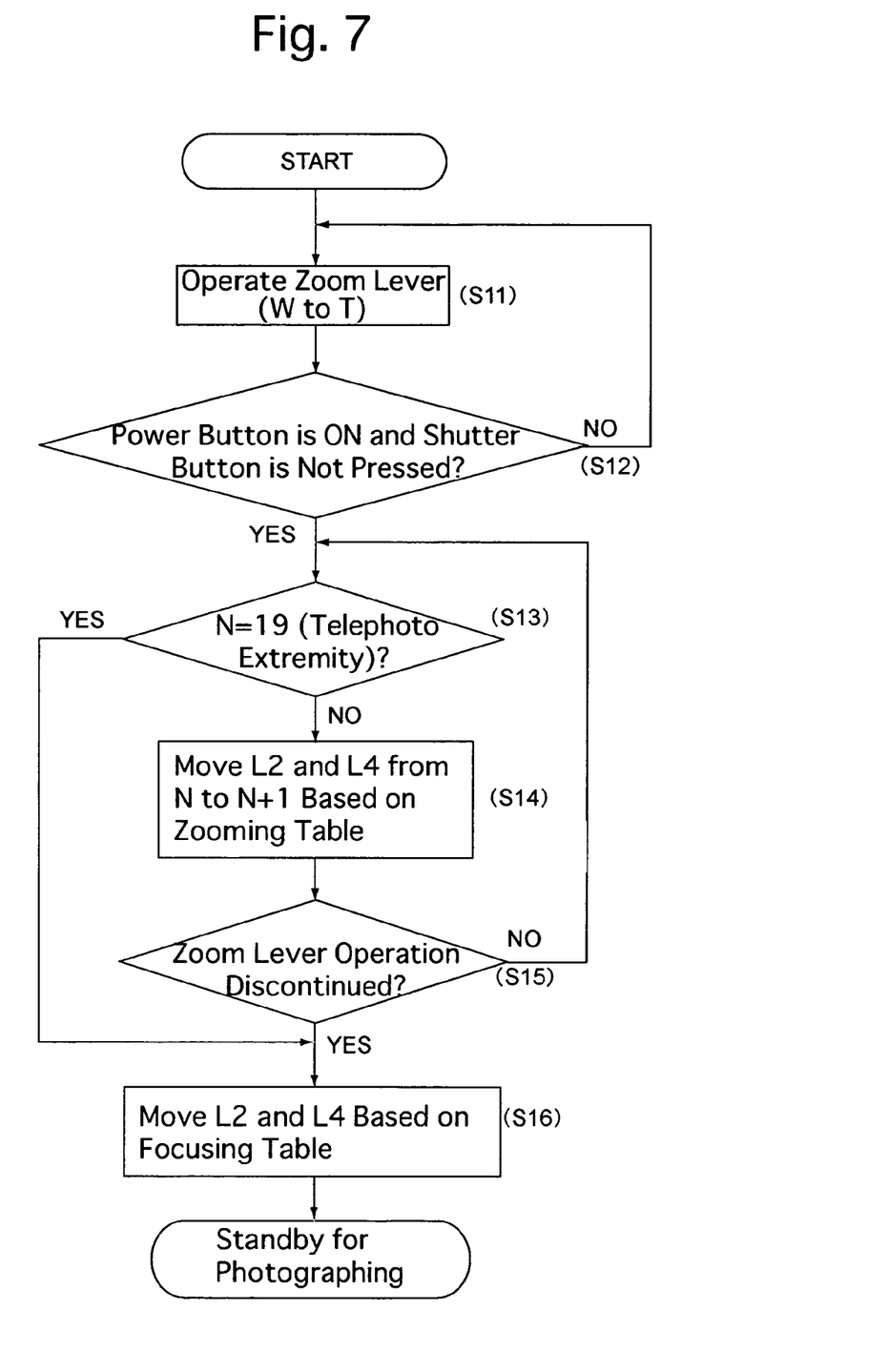
FIG. 7 is a flowchart of the zooming operation according to the present invention.

When the zoom operation lever ZL is turned to the wide-angle side (the direction represented by an arrow W in FIG. 1) for varying the focal length of the zoom lens system stepwise from the telephoto side to the wide-angle side, a procedure essentially the same as in the flowchart shown in FIG. 7 is employed except that the phase of pulse signals to be sent to the pulse motors M2 and M4 is different from that when the focal length is varied from the wide-angle side to the telephoto side. Accordingly, the procedure in this case is different from that when the lens groups travel from the wide-angle side to the telephoto side in the following points: the pulse motors M2 and M4 rotate in the opposite direction to when the lens groups travel from the wide-angle side to the telephoto side; in a step corresponding to step S13 of the flowchart, the CPU 30 determines whether or not the current zoom step is N=1 (wide-angle extremity); and in a step corresponding to step S14, the CPU 30 reads data from both of the zooming tables for moving the second and fourth lens groups L2 and L4, respectively, from the current zoom step N to zoom step N−1 which is one step closer to the wide-angle side.

Figure 9:
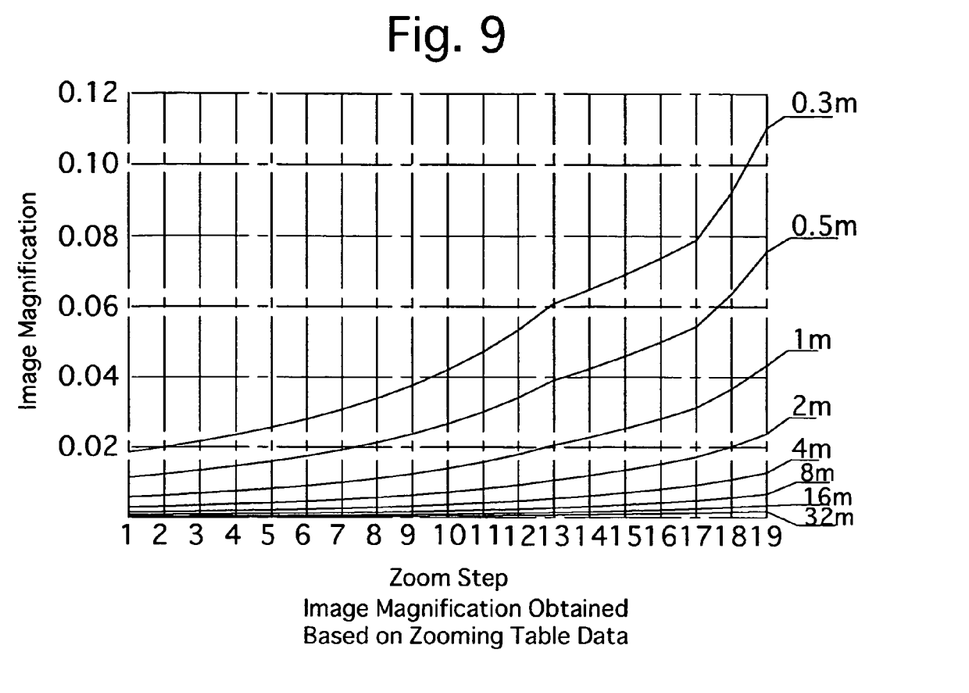
FIG. 9 shows changes in image magnification during step zooming.

The zoom paths of the second and fourth lens groups L2 and L4 when the second and fourth lens groups L2 and L4 were allowed to travel from the wide-angle extremity to the telephoto extremity according to the zooming operation descried above are shown in FIG. 8. In FIG. 8, the optical axial positions of the second and fourth lens groups L2 and L4 at the respective zoom steps (1 through 19) are shown for various photographing distances L (0.3 m, 0.5 m, 1 m, 2 m, 4 m, 8 m, 16 m, 32 m, and 8∞) based on the zooming tables. The zoom path for each photographing distance L based on the zooming tables is obtained by connecting the optical axial positions of the second lens group L2 and the fourth lens group L4 at each of the zoom steps (if the photographing distance is 2 m, the zoom path for L=2 m is obtained). The relationship between the zoom step, the photographing distance L, and the image magnification is adjusted as shown in FIG. 9, thereby preventing the reversed phenomenon in the image magnification between the wide-angle extremity (zoom step 1) and the telephoto extremity (zoom step 19) during step zooming. The image magnification can properly follow the change in zoom step. Thus, images are continuously displayed on the monitor without unnatural magnification variation.

In addition, if the operator releases the finger from the zoom operation lever ZL, the zoom operation lever ZL automatically returns to the initial position regardless of the turning direction of the zoom operation lever ZL (toward the telephoto side or the wide-angle side).

Figure 10:
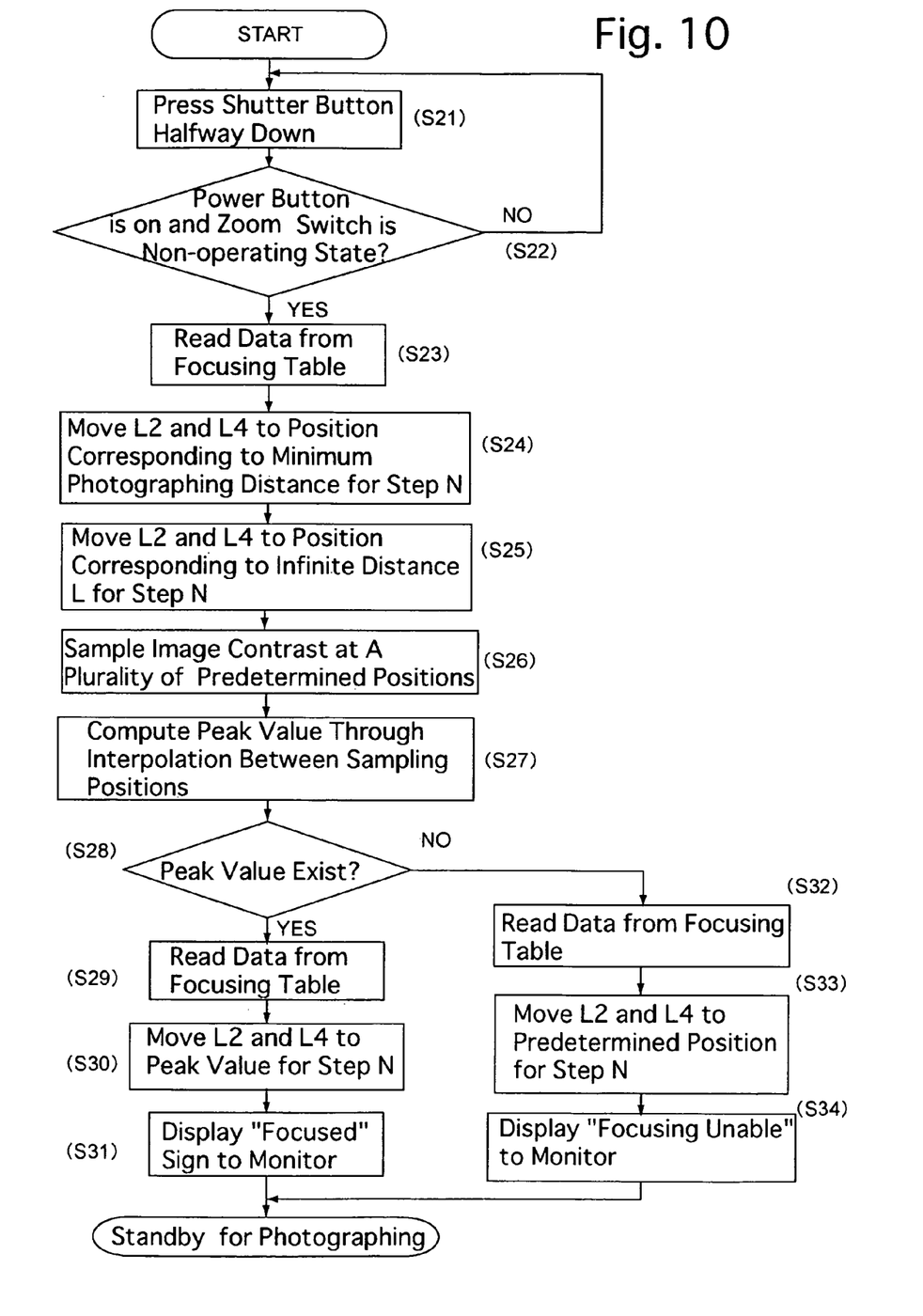
FIG. 10 is a flowchart of the focusing operation according to the present invention.

The operating procedure for AF and the operation of the second and fourth lens groups L2 and L4 during an autofocusing operation will be described hereinafter with reference to a flowchart of FIG. 10.

Figure 11:
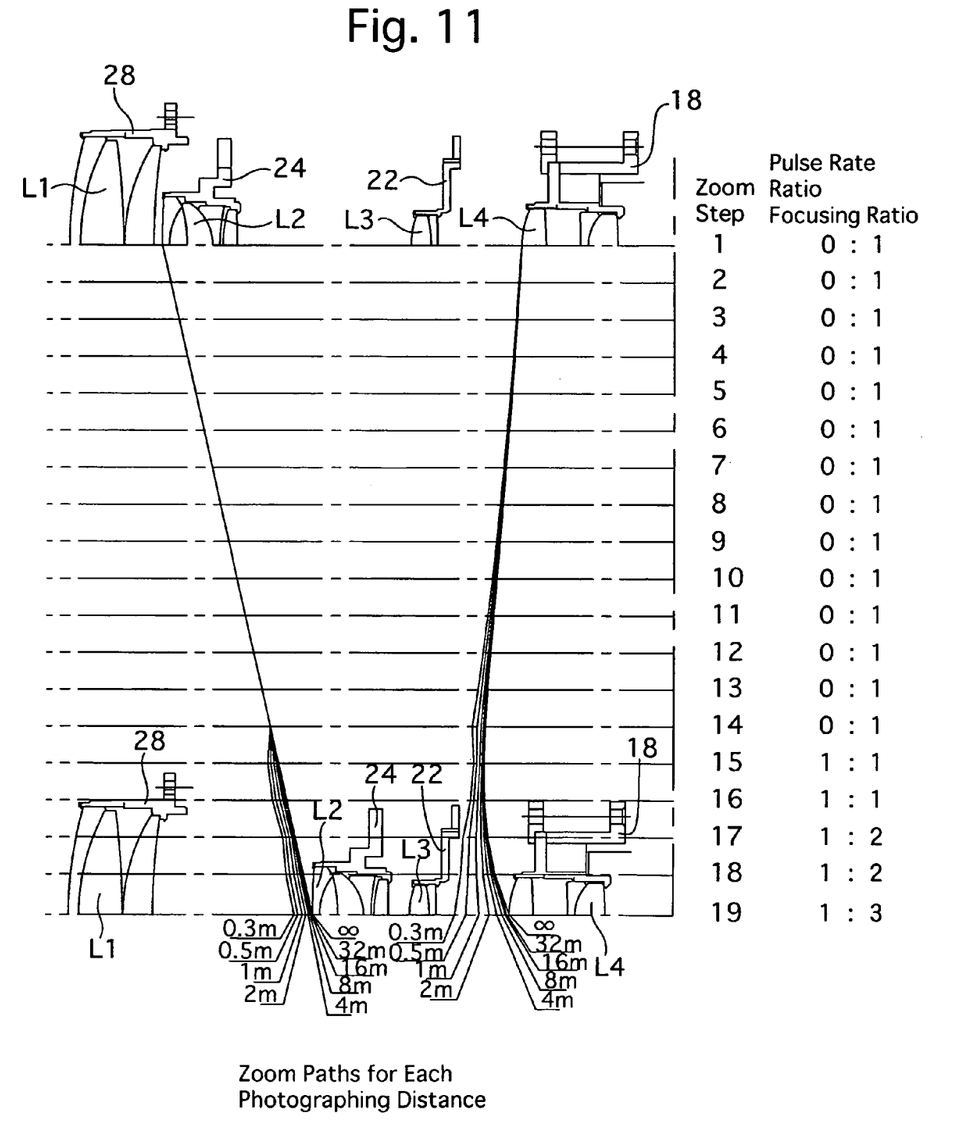
FIG. 11 shows the optical axial positions of second and fourth lens groups defined in a focusing table for each zoom step for each photographing distance.

In accordance the zooming procedure described above, the second and fourth lens groups L2 and L4 have traveled to zoom step N (N is an integer from 1 to 19). When the shutter button B2 is pressed halfway down (step S21), the CPU 30 determines whether or not the power switch is ON and whether or not the zoom operation lever ZL is in a non-operating state (step 22). If the CPU 30 determines that the power switch is OFF or the zoom operation lever ZL is in an operating state, the CPU 30 does not send a pulse signal to the pulse motors M2 and M4. Consequently, the second and fourth lens groups L2 and L4 are not allowed to move. On the other hand, if the CPU 30 determines that the power switch is ON and the zoom operation lever ZL is in a non-operating state in step S22, the CPU 30 reads data for the minimum photographing distance and the infinite distance at zoom step N from the focusing table (step S23), and sends a pulse signal while changing its phase to the pulse motors M2 and M4. The pulse motors M2 and M4 rotate accordingly, and a focus scan is performed. During the focus scan, the second and fourth lens groups L2 and L4 initially move to a position corresponding to the minimum photographing distance (in the present embodiment, the minimum photographing distance during zooming scan is set at 0.3 m) at zoom step N (step S24), and subsequently move to a position corresponding to the infinite distance at zoom step N (step S25). In FIG. 11, the optical axial positions of the second and fourth lens groups L2 and L4 at the respective zoom steps (1 through 19) based on the focusing table are shown for various photographing distances L (0.3 m, 0.5 m, 1 m, 2 m, 4 m, 8 m, 16 m, 32 m, and ∞). As shown in FIG. 11, the optical axial positions for each photographing distance L are connected.

The data for carrying out the focus scan is defined so that the ratio of the pulse rates of pulse signals to be sent to the respective pulse motors M2 and M4 for any zoom step (any N from 1 through 19) is a constant defined for each of the zoom steps (predetermined value), so that during the focus scan by the second and fourth lens groups L2 and L4, the fourth lens group L4 moves at a moving distance of the second lens group L2 multiplied by this constant (or at a moving speed of the second lens group L2 multiplied by this constant). In particular, as shown in FIG. 11, the ratio of the pulse rates of the pulse motors M2 and M4 is 0:1 for zoom steps 1 through 14 (wherein the second lens group L2 is not allowed to move), 1:1 for zoom steps 15 and 16 (the ratio of the moving distances and of the speeds of the second and fourth lens groups L2 and L4 are 1:1), 1:2 for zoom steps 17 and 18 (the ratio of the moving distances and of the speeds of the second and fourth lens groups L2 and L4 is 1:2), and 1:3 for zoom step 19 (the ratio of the moving distances and of the speeds of the second and fourth lens groups L2 and L4 is 1:3).

At the wide-angle extremity (zoom step 1) and also at the telephoto extremity (zoom step 19), the data values of the focusing table are the same as the data values of the zooming table. Therefore, as shown in FIGS. 8 and 11, the optical axial positions of the second and fourth lens groups L2 and L4 based on the focusing table are identical to the optical axial positions of the second and fourth lens groups L2 and L4 based on the zooming table regardless of the photographing distance L.

In addition, since the pulse rates of the pulse signal sent to the pulse motor M2 are the same at zoom steps 17 to 19 regardless of the photographing distance L, the zoom paths of the second lens group L2 are parallel to each other for zoom steps 17 through 19, as shown in FIG. 8. According to this configuration, the zoom paths are determined in a simplified manner.

Upon completion of the focus scan by the second and fourth lens groups L2 and L4, the CPU 30 compares the contrast values of all the images picked up by the CCD 16 at various predetermined sampling positions in the focus scan range (step S26), and then calculates a peak value by interpolating the contrast values between the sampling positions (step S27). If the CPU 30 determines that the peak value exists in step S28, the CPU 30 reads data for moving the second and fourth lens groups L2 and L4 from the current position to the peak position from the focusing table (step S29), and sends pulse signals according to the focusing table data to the pulse motors M2 and M4. Subsequently, the second and fourth lens groups L2 and L4 are moved to the peak position (step S30). The ratio of the pulse rates of the pulse motors M2 and M4 is the same as the ratio of the moving distances during focusing for each zoom step as shown in FIG. 11. The ratio of the moving distances and the ratio of the moving speed of the second and fourth lens groups L2 and L4 during focusing are also the same as the ratio of the moving distances for each zoom step. When the second and fourth lens groups L2 and L4 reach the peak position (focused positions), a "focused" indication is displayed on the monitor provided in the rear surface of the camera body 10a (step S31), and the camera enters the standby state for photographing in which a focused image can be photographed by fully pressing the shutter button B2 down.

However, if the CPU 30 determines that the peak value does not exist in step S28, the CPU 30 reads data in the case when the peak value does not exist from the focusing table (step S32). The second and fourth lens groups L2 and L4 are then moved to a predetermined position (for example, a position where the zoom lens system is focused under the conditions of zoom step N and the predetermined photographing distance (e.g. 2 m), or an over focused distance) according to the data (step S33), and a "focusing unable" indication is displayed on the monitor (step S34).

Figure 12:
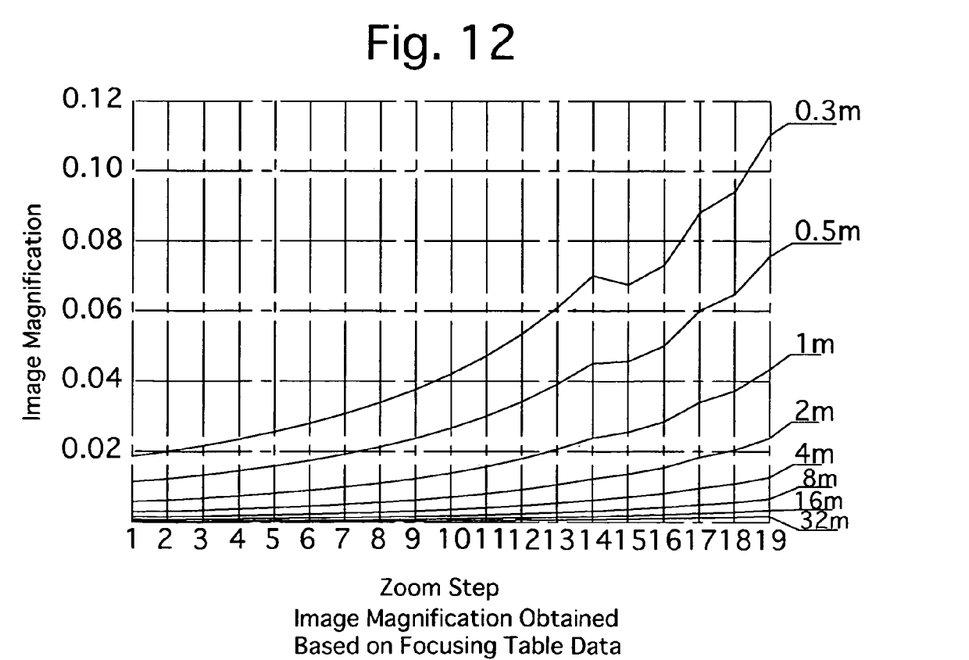
FIG. 12 shows changes in image magnification in the case where step zooming is performed based on focusing table data.
Figure 13:
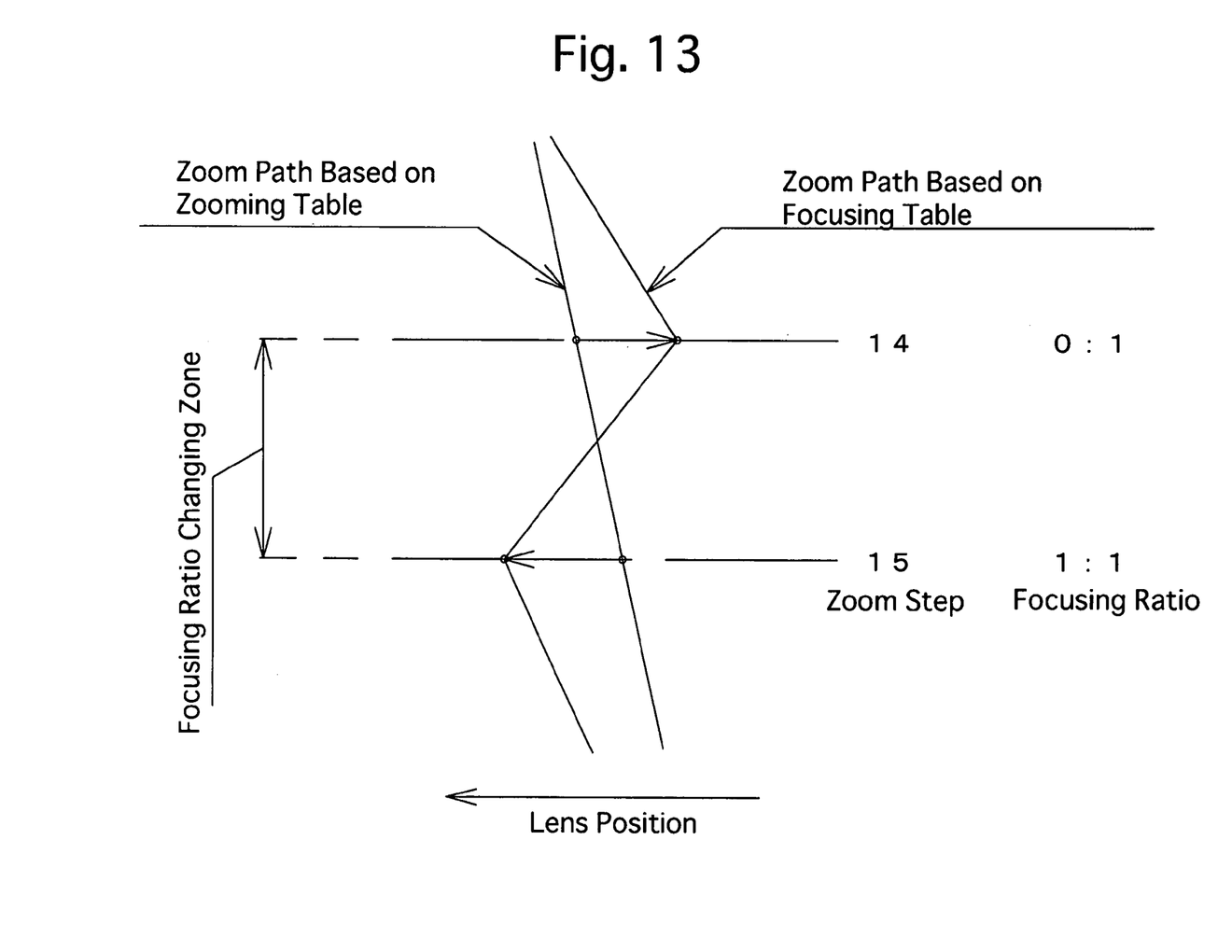
FIG. 13 shows a zoom path of the second lens group via use of a zooming table and a zoom path obtained in case where step zooming is performed based on focusing table data, for zoom steps 14 and 15.

In this embodiment, the step zooming operation is carried out based on both of the zooming tables which are different from the focusing table. As a result, a reversed phenomenon and an unchanged phenomenon of the image magnification do not occur during step zooming as shown in FIG. 9, and accordingly, a user viewing images displayed on a monitor does not sense the zooming effect as being unnatural. When zooming is performed according to zoom paths obtained through connecting the optical axial positions of the second and fourth lens groups L2 and L4 for each zoom step defined in the focusing table (the zoom paths shown in FIG. 11), the image magnifications are reversed between zoom steps 14 and 15 at a photographing distance of 0.3 m, and the image magnifications are almost unchanged between zoom steps 14 and 15 at a photographing distance of 0.5 m, as shown in FIG. 12.

In addition, the zoom paths of the second and fourth lens groups L2 and L4 defined in the respective zooming tables thereof are defined so as to be substantially the same as the zoom paths obtained assuming that zooming of the second and fourth lens groups L2 and L4 is performed according to the focusing table. Therefore, the image magnification is almost unchanged during the operation in step S16 of the step zooming operation (the operation in which the second and fourth lens groups L2 and L4 are moved from the positions defined in the corresponding zooming tables to the positions defined in the focusing table), and a user viewing a monitor at this time does not sense the step zooming operation as being unnatural.

Furthermore, the data values of the zooming tables and the focusing table are the same at the wide-angle side and also at the telephoto side. If a zooming adjustment is performed in accordance with one of a zooming operation via the zooming table and a focusing operation via the focusing table, the other of the zooming operation and the focusing operation is also considered to be performed. In other words, a magnification check for the other lens operation is not required at the wide-angle extremity and the telephoto extremity. Therefore, a zooming adjustment is only required to be performed for a zooming operation or focusing operation via either the zooming table or the focusing table, respectively.

Furthermore, the zoom paths of the second and fourth lens groups L2 and L4 during focusing are defined such that the ratio of the moving distances of the second and fourth lens groups L2 and L4 during focusing is a predetermined value defined for each zoom step. Therefore, the lens systems can be easily controlled during the AF operation compared with that of a conventional zoom lens system, and also the control system can be configured in a simpler manner.

In addition, in this embodiment, the rotation angles of both the pulse motors M2 and M4 are the same, and the rotational force transmission mechanism between the pulse motor M2 and the second lens group L2 (the upper guide rod 17, the rack 19, and the feed screw 21) and the rotational force transmission mechanism between the pulse motor M4 and the fourth lens group L4 (the upper guide rod 17, the rack 25, and the feed screw 27) have the same configuration. Namely, both rotational force transmission mechanisms have the same moving pitch (when the both pulse motors M2 and M4 rotate by the same angle, the second and fourth lens groups L2 and L4 travel the same distance along the optical axis O). Furthermore, the ratio of the pulse rates of the pulse motors M2 and M4 for each zoom step is set to the same as the ratio of the moving distances of the second and fourth lens groups L2 and L4 for each zoom step during focusing, and the second and fourth lens groups L2 and L4 are moved along predetermined zoom paths for focusing. Thus, a control system can be configured in a simpler manner. In other words, if the same ratio of the pulse rates for the pulse motors M2 and M4 as the abovementioned ratio of the moving distances is employed for each zoom step and the ratio is held constant at a given zoom step, it is sufficient to provide only one focusing table for the second lens group L2 or the fourth lens group L4 for each zoom step. Namely, a pulse signal to be sent from the CPU 30 to the pulse motor of the other lens group of the second and fourth lens groups L2 and L4 can be obtained by multiplying the pulse signal for the pulse motor of the lens group of the second and fourth lens groups L2 and L4 to which the focusing table is provided by the ratio of the moving distances (ratio of the moving speeds). Therefore, two focusing tables containing different data for each zoom step are not necessary.

Although the ratio of the pulse rates of the pulse motors M2 and M4 during focusing is defined as above, an alternative ratio may be employed. The alternative ratio is desirably an integer as employed in this embodiment for facilitating control of the focusing operation.

The present invention has been described by way of example for a zoom lens system having two movable lens groups, each having both a focusing function and a zooming function, but the invention may be applied to any zoom lens system including a single movable lens group, or three or more movable lens groups. The present invention may also be applied to zoom lens systems having a number of lens groups other than four, or a four-lens-group lens system having a combination of two types of lens groups which serve as a focusing lens group and a zooming lens group, the focusing lens group and the zooming lens group consisting of a number lens groups other than two and four.

In addition, the present invention may be applied not only to the digital camera 10 but also to a film camera, an endoscope, a macrometer, and the like.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An AF control apparatus for a zoom lens system, comprising:
   a movable lens group configured to serve as a zooming lens group and as a focusing lens group in the zoom lens system;
   a focusing table which stores focusing data for said movable lens group, said focusing table being configured to store a plurality of focal length steps and lens position information for plural in-focus positions at each focal length step;
   a zooming table which stores zooming data for said movable lens group, said zooming table being configured to store said plurality of focal length steps and lens position information for plural in-focus positions different than the in-focus positions of the focusing table for a same focal length step; and
   a driving device for moving said movable lens group in an optical axis direction of said zoom lens system such that the movable lens group is moved, at a beginning of a zooming operation, while positioned at a first focal length step, to a zoom path defined by the data of the zooming table for the first focal length step, the lens group then being moved, along the zoom path defined by the data of the zooming table, from the first focal length step to the second focal length step, and at a conclusion of the zooming operation, the movable lens group is moved, while at the second focal length step, from the zoom path defined by the data of the zooming table, to a position based upon the data of the focusing table.

2. The AF control apparatus for a zoom lens system according to claim 1, wherein
   data values of said zooming table and of said focusing table are the same at a wide-angle extremity and at a telephoto extremity.

3. The AF control apparatus for a zoom lens system according to claim 1, wherein
   said driving device drives said movable lens group to automatically move according to the data stored in said focusing table upon completion of a zooming operation.

4. The AF control apparatus for a zoom lens system according to claim 1, wherein said movable lens group comprises two movable lens groups.

5. The AF control apparatus for a zoom lens system according to claim 4, wherein said two movable lens groups comprise second and fourth lens groups of a four-lens-group zoom lens system.

6. The AF control apparatus for a zoom lens system according to claim 5, wherein the moving distance of said fourth lens group is larger than the moving distance of said second lens group during said autofocusing operation.

7. The AF control apparatus for a zoom lens system according to claim 4, wherein the zoom paths of said movable lens groups are parallel to each other from a telephoto extremity of the zoom lens system to at least one zoom step spaced from the telephoto extremity.

8. The AF control apparatus for a zoom lens system according to claim 1, comprising:
   a step zoom mechanism for moving a plurality of movable lens groups along a zoom step path in accordance with a plurality of zoom steps,
   wherein a zoom path of each of said movable lens groups during an auto focusing operation is defined so that a ratio of moving distances of said movable lens groups at each of said zoom steps is a predetermined value defined for said each of said zoom steps.

9. The AF control apparatus for a zoom lens system according to claim 8, wherein said plurality of said movable lens groups comprises two movable lens groups.

10. The AF control apparatus for a zoom lens system according to claim 8, wherein
    said driving device comprises:
    a plurality of pulse motors, the number of pulse motors corresponding to the number of said movable lens groups, each of said pulse motors providing a driving force to a respective one of said movable lens groups, wherein each of said pulse motors have the same step angle;
    a plurality of rotational force transmission mechanisms, the number of rotational force transmission mechanisms corresponding to said number of said movable lens groups, each of said rotational force transmission mechanisms transmitting a driving force generated by one of said pulse motors to a corresponding one of said movable lens groups, wherein each of said rotational force transmission mechanisms have the same moving pitch; and
    a control device for sending a pulse signal having a pulse rate defined for each pulse motor to each of said pulse motors, and wherein a ratio of said pulse rates, of the pulse signals to be sent to said pulse motors during said autofocusing operation, is the same as a corresponding ratio of the moving distances of said movable lens groups determined via said focusing table.

11. The AF control apparatus for a zoom lens system according to claim 8, wherein the ratio of the moving distances for at least one zoom step is an integer ratio.

12. An AF control apparatus for a zoom lens system, the AF control apparatus comprising:
- a movable lens group configured to serve as a zooming lens group and as a focusing lens group in the zoom lens system;
- a focusing table which stores focusing data for said movable lens group;
- a zooming table which stores zooming data for said movable lens group, said zooming table having data different than the data of the focusing table, data values of said zooming table and data values of said focusing table being the same at the wide angle extremity and at the telephoto extremity of said zoom lens system; and
- a driving device for moving said movable lens group in an optical axis direction of the zoom lens system in accordance with data stored in said focusing table and in said zooming table.

13. The AF control apparatus for a zoom lens system according to claim 12, the driving device being configured to drive said movable lens group to move according to the data stored in the focusing table upon completion of a zooming operation.

14. The AF control apparatus for a zoom lens system according to claim 12, wherein said movable lens comprises two movable lens groups.

15. The AF control apparatus for a zoom lens system according to claim 14, wherein said two movable lens groups comprise second and fourth lens groups of a four lens group zoom lens system.

16. The AF control apparatus for a zoom lens system according to claim 15, wherein the moving distance of said fourth lens group is larger than the moving distance of said second lens group during said autofocusing operation.

17. The AF control apparatus for a zoom lens system, comprising:
- a movable lens group configured to serve as a zooming lens group and as a focusing lens group in the zoom lens system;
- a focusing table which stores focusing data for said movable lens group, said focusing table being configured to store a plurality of focal length steps and lens position information for plural in-focus positions at each of said focal length steps;
- a zooming table which stores zooming data for said movable lens group, said zooming table being configured to store said plurality of focal length steps and lens position information for plural in-focus positions different than the in-focus positions of the focusing table for a same focal length step; and
- a driving device for moving said movable lens group in an optical axis direction of said zoom lens system in accordance with data stored in said focusing table and in said zooming table to perform a zooming operation between first and second focal length positions of the zoom lens system such that said movable lens group is moved while at the first focal length position, to a position defined by the data of the zooming table for the first focal length position, is moved in accordance with data stored in said zooming table to the second focal length position and is then moved in accordance with the data of the focusing table while at the second focal length position.

18. An AF control apparatus for a zoom lens system, comprising:
- a movable lens group configured to serve as a zooming lens group and as a focusing lens group in the zoom lens system;
- a focusing table which stores focusing data for said movable lens group, said focusing table being configured to store a plurality of focal length steps and lens position information for plural in-focus positions at each focal length step;
- a zooming table which stores zooming data for said movable lens group, said zooming table being configured to store said plurality of focal length steps and lens position information for plural in-focus positions different than the in-focus positions of the focusing table for a same focal length step; and
- a driving device for moving said movable lens group in an optical axis direction of said zoom lens system such that the movable lens group is moved, at a beginning of a zooming operation, to a zoom path defined by the data of the zooming table, the lens group then being moved, along the zoom path defined by the data of the zooming table, from the first focal length step to the second focal length step, and at a conclusion of the zooming operation, the movable lens group is moved, from the zoom path defined by the data of the zooming table, to a position based upon the data of the focusing table.

19. A method for controlling an AF apparatus for a zoom lens system, the zoom lens system including a movable lens group configured as a zoom lens group and as a focusing lens group, the control method comprising:
- storing focusing data for the movable lens group, the focusing data comprising a plurality of focal length steps and lens position information for plural in-focus positions at each of the focal length steps;
- storing zooming data for the movable lens group, the zooming data comprising the plurality of focal length steps and lens position information for plural in-focus positions, the plural in-focus positions being different than the in-focus positions of the focusing table for a same focal length step;
- moving the movable lens group in an optical axis direction of the zoom lens system such that the movable lens group is moved, at a beginning of a zooming operation, while positioned at a first focal length step, to a zoom path defined by the data of the zooming table for the first focal length step, the lens group then being moved, along the zoom path defined by the zooming table, from the first focal length step to the second focal length step, and at a conclusion of the zooming operation, the movable lens group is moved, while at the second focal length step, from the zoom path defined by the data of the zooming table, to a position based upon the data of the focusing table.

20. The control method according to claim 19, further comprising providing the focusing data and the zooming data to be the same at a wide angle extremity and at a telephoto extremity of the zoom lens system.

21. The control method according to claim 19, further comprising driving the movable lens group to automatically move according to the stored focusing data upon completion of a zooming operation.

* * * * *